US012794127B2

(12) United States Patent
Liu et al.

(10) Patent No.: US 12,794,127 B2
(45) Date of Patent: Nov. 10, 2026

(54) MULTI-BAND ANTENNA

(71) Applicant: MEDIATEK INC., Hsin-Chu (TW)

(72) Inventors: Nai-Chen Liu, Hsinchu City (TW); Yu-Chen Chen, Hsinchu City (TW); Chung-Hsin Chiang, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 117 days.

(21) Appl. No.: 18/731,366

(22) Filed: Jun. 3, 2024

(65) Prior Publication Data

US 2025/0015498 A1 Jan. 9, 2025

Related U.S. Application Data

(60) Provisional application No. 63/511,697, filed on Jul. 3, 2023.

(51) Int. Cl.

*H01Q 9/04* (2006.01)
*H01Q 1/50* (2006.01)
*H01Q 5/35* (2015.01)
*H01Q 9/28* (2006.01)

(52) U.S. Cl.

CPC ............. *H01Q 9/0414* (2013.01); *H01Q 1/50* (2013.01); *H01Q 5/35* (2015.01); *H01Q 9/28* (2013.01)

(58) Field of Classification Search

CPC ........ H01Q 9/0414; H01Q 5/35; H01Q 9/285; H01Q 19/005; H01Q 21/065

See application file for complete search history.

(56) References Cited

U.S. PATENT DOCUMENTS

| | | | | |
|---|---|---|---|---|
| 10,033,109 | B1 * | 7/2018 | Gummalla | H01Q 13/10 |
| 2019/0027814 | A1 * | 1/2019 | Hsu | H01Q 1/246 |
| 2021/0013610 | A1 * | 1/2021 | Chiang | H01Q 21/24 |
| 2021/0313708 | A1 * | 10/2021 | Lee | H01Q 21/067 |
| 2025/0260169 | A1 * | 8/2025 | Komura | H01Q 1/2283 |

* cited by examiner

*Primary Examiner* — Alexander H Taningco
(74) *Attorney, Agent, or Firm* — Winston Hsu

(57) ABSTRACT

An antenna for multi-band communication includes a plurality of radiators which are physically separated from each other. Each radiator is disposed on different planes and is used to jointly function as one or more dipoles. Further, each radiator contributes to resonances at two or more non-overlapping bands. This compact, multi-layered antenna structure is designed for space-efficient operation in multiple frequency bands. It is particularly suitable for portable communication devices with size constraints, as it provides transmit and/or receive capabilities across different bands while occupying minimal space.

20 Claims, 17 Drawing Sheets

CV with I-II

MULTI-BAND ANTENNA

CROSS REFERENCE TO RELATED APPLICATIONS

This application claims the benefit of U.S. Provisional Application No. 63/511,697, filed on Jul. 3, 2023. The content of the application is incorporated herein by reference.

BACKGROUND

Modern electronic devices, such as smartphones, tablet computers, and laptops, require antennas to enable radio-frequency functionality. As communication standards advance to offer faster data transfer rates and higher throughput, antennas must meet increasingly challenging requirements. For instance, to comply with the fifth-generation (5G) mobile telecommunication standards at FR2 bands using multi-input multi-output (MIMO) with dual-polarization diversity, an antenna must support bandwidths at two non-overlapping bands greater than 19.5% (24.25 to 29.5 GHz) and 16.1% (37.0 to 43.5 GHz). Furthermore, the antenna must be capable of transmitting and/or receiving independent signals with different polarizations (e.g., two signals carrying two different data streams using horizontal and vertical polarizations) while maintaining high signal isolation between these polarizations to achieve a high cross-polarization discrimination (XPD). Meeting these requirements is essential for antennas to effectively support the latest communication standards in modern electronic devices.

Moreover, antennas need to be compact in size to accommodate the slim form factors of modern electronic devices, which have limited space for antenna placement. As a result, antennas must have a high bandwidth-to-volume ratio (measured in units such as Hz/mm$^3$), to maximize bandwidth performance within a given volume.

Conventional stacked patch antennas, which support two bands by stacking two patches, fail to meet the bandwidth requirements of 5G mobile telecommunication standards. Additionally, these stacked patch antennas have a relatively low bandwidth-to-volume ratio, making them less suitable for modern electronic devices with stringent size constraints.

SUMMARY

An embodiment provides an antenna for multi-band communication comprising a plurality of radiators which are physically separated from each other. Each radiator is disposed on different planes and is used to jointly function as one or more dipoles. Further, each radiator contributes to resonances at two or more non-overlapping bands.

An embodiment provides an antenna for multi-band communication, comprising a first radiator, a second radiator, a third radiator and a fourth radiator. The second radiator is disposed below the first radiator and partially overlaps the first radiator forming a first overlapping region. The third radiator is disposed below the second radiator and partially overlaps the first radiator and the second radiator forming a second overlapping region. The fourth radiator is disposed below the third radiator and partially overlaps the first radiator, the second radiator, and the third radiator forming a third overlapping region and a fourth overlapping region. The first radiator, the second radiator, the third radiator and the fourth radiator are physically separated.

These and other objectives of the present invention will no doubt become obvious to those of ordinary skill in the art after reading the following detailed description of the preferred embodiment that is illustrated in the various figures and drawings.

DETAILED DESCRIPTION

Figure 1A:
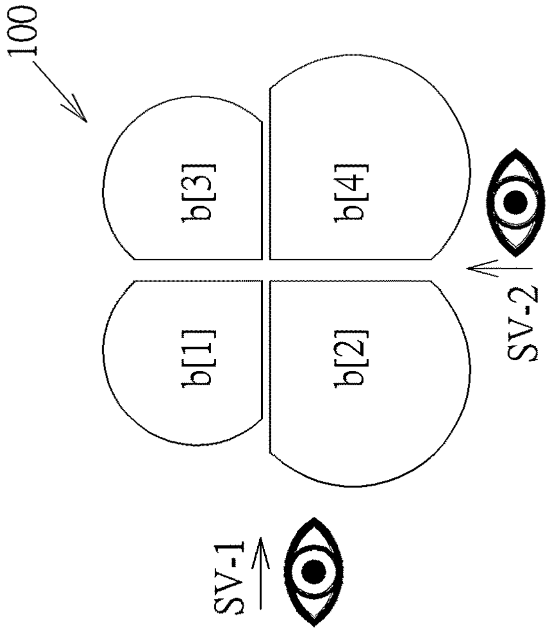
FIG. 1A, FIG. 1B and FIG. 1C depict an antenna according to an embodiment.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

The antenna standards for 5G networks are designed to support the higher data rates, lower latency, and increased capacity required by the next generation of mobile communication. 5G antennas need to operate in multiple frequency bands, including the sub-6 GHz (FR1) and millimeter-wave (mmWave) bands (FR2), supporting wide bandwidths to accommodate high data rates. They must also support multiple-input, multiple-output (MIMO) technology, beamforming, and dual-polarization diversity to improve spectrum efficiency, capacity, and coverage while maintaining high signal isolation between different polarizations. Compact size is essential for 5G antennas to fit within the limited space available in modern electronic devices while maintaining a high bandwidth-to-volume ratio.

Furthermore, 5G antennas require beam steering and tracking capabilities, particularly in the mmWave bands, to maintain reliable connections with mobile devices. They must also be designed to integrate seamlessly with other components, such as filters, amplifiers, and transceivers, to form complete radio frequency (RF) front-end modules. Standards organizations, including the 3rd Generation Partnership Project (3GPP), the International Telecommunication Union (ITU), and the European Telecommunications Standards Institute (ETSI), play a crucial role in defining and maintaining the antenna standards for 5G networks. These standards ensure interoperability, performance, and reliability across different devices and networks, enabling the successful deployment and adoption of 5G technology.

The present disclosure focuses on a compact multi-band antenna structure that can be used in various applications requiring operation in multiple frequency bands. The antenna is constructed using several layers or planes, allowing it to be implemented in a space-efficient manner. One potential use for this antenna structure is in portable communication devices, where it can provide transmit and/or receive capabilities across different frequency bands while occupying minimal space within the device. The compact nature of the antenna makes it particularly suitable for applications where size constraints are a primary concern.

Figure 1B:
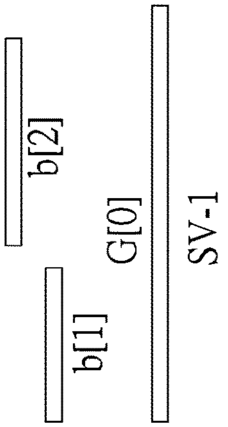
Figure 1C:
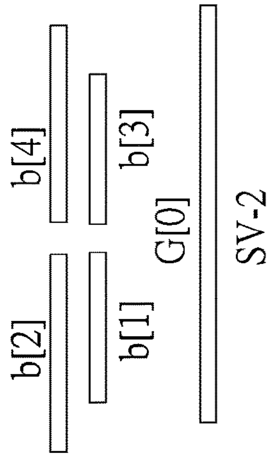

FIG. 1A depicts a top view of an antenna 100 according to an embodiment. FIG. 1B depicts a side view (SV−1) of the antenna 100. FIG. 1C depicts another side view (SV−2) of the antenna 100. The antenna 100 may satisfy demands of advanced multi-band and multi-polarization communication standards, such as 5G mobile telecommunication at two separated FR2 bands with MIMO of dual-polarization diversity. Besides, the antenna 100 may also be compact in size to provide a high bandwidth-to-volume ratio.

The antenna 100 includes radiators b[1], b[2], b[3] and b[4], which are physically separated and insulated from each other. The radiators b[1] and b[3] are disposed on a first plane, and the radiators b[2] and b[4] are disposed on a second plane above the first plane. The radiators b[1], b[2], b[3] and b[4] are disposed above a ground plane G[0]. While not drawn to scale, in some embodiments, the radiators b[1], b[2], b[3] and b[4] may be identical or different in size, shape and/or orientation.

Figure 2A:
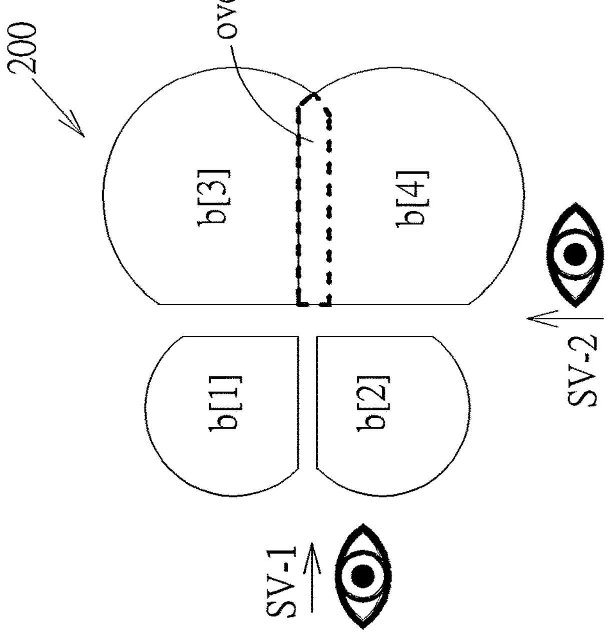
FIG. 2A, FIG. 2B and FIG. 2C depict an antenna according to a different embodiment.
Figure 2B:
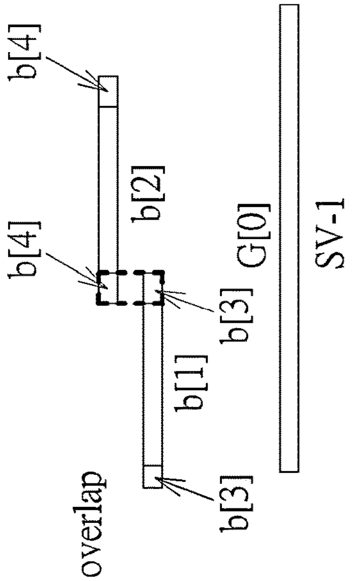
Figure 2C:
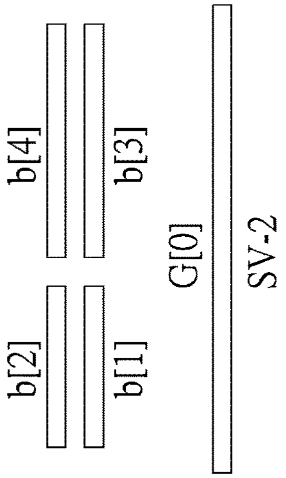

FIG. 2A depicts a top view of an antenna 200 according to an embodiment. FIG. 2B depicts a side view of the antenna 200. FIG. 2C depicts another side view of the antenna 200. The antenna 200 may satisfy demands of advanced multi-band and multi-polarization communication standards, such as 5G mobile telecommunication at two separated FR2 bands with MIMO of dual-polarization diversity. Besides, the antenna 200 may also be compact in size to provide a high bandwidth-to-volume ratio. Please note that the solid dotted lines in the drawings represent one or more overlapping regions for illustration purpose.

The antenna 200 includes radiators b[1], b[2], b[3] and b[4], which are physically separated and insulated from each other. The radiators b[1] and b[3] are disposed on a first plane, and the radiators b[2] and b[4] are disposed on a second plane above the first plane. The radiators b[3] and b[4] overlap each other to form an overlapping region. Compared to the traditional design, the overlapping design can shrink the size the antenna 200 without impacting its operating frequency on the lower end. In other words, the overlapping design can extend its operating frequency on the lower end compared to the traditional design with the same size of the antenna. While not drawn to scale, in some embodiments, the radiators b[1], b[2], b[3] and b[4] may be identical or different in size, shape and/or orientation.

Figure 3A:
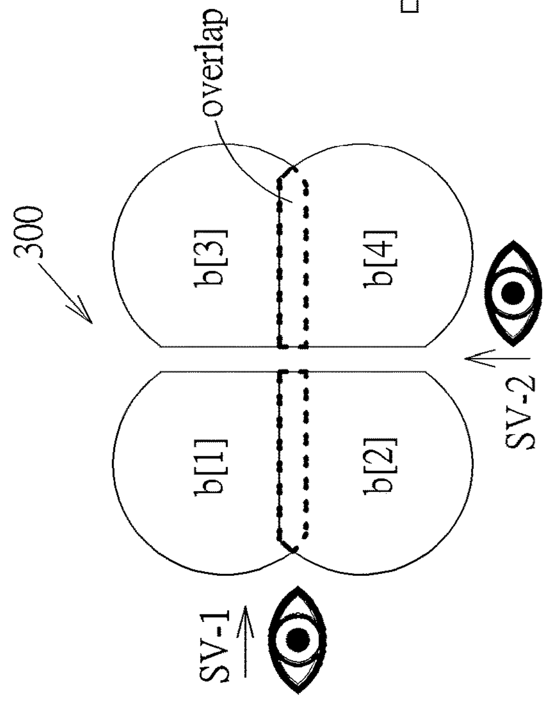
FIG. 3A, FIG. 3B and FIG. 3C depict an antenna according to a different embodiment.
Figure 3B:
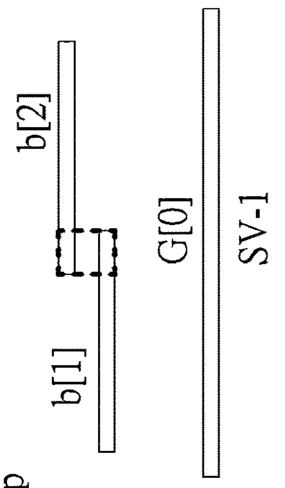
Figure 3C:
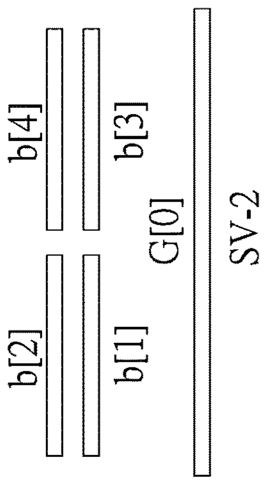

FIG. 3A depicts a top view of an antenna 300 according to an embodiment. FIG. 3B depicts a side view of the antenna 300. FIG. 3C depicts another side view of the antenna 300. The antenna 300 may satisfy demands of advanced multi-band and multi-polarization communication standards, such as 5G mobile telecommunication at two separated FR2 bands with MIMO of dual-polarization diversity. Besides, the antenna 300 may also be compact in size to provide a high bandwidth-to-volume ratio.

The antenna 300 includes radiators b[1], b[2], b[3] and b[4], which are physically separated and insulated from each other. The radiators b[1] and b[3] are disposed on a first plane, and the radiators b[2] and b[4] are disposed on a second plane above the first plane. The radiators b[1] and b[2] overlap each other to form a first overlapping region. The radiators b[3] and b[4] overlap each other to form a second overlapping region. Compared to the traditional design, the overlapping design can shrink the size the antenna 300, thereby extend its operating frequency on the lower end.

FIG. 3A depicts a top view of an antenna 300 according to an embodiment. FIG. 3B depicts a side view of the antenna 300. FIG. 3C depicts another side view of the antenna 300. The antenna 300 may satisfy demands of advanced multi-band and multi-polarization communication standards, such as 5G mobile telecommunication at two separated FR2 bands with MIMO of dual-polarization diversity. Besides, the antenna 300 may also be compact in size to provide a high bandwidth-to-volume ratio.

The antenna 300 includes radiators b[1], b[2], b[3] and b[4], which are physically separated and insulated from each other. The radiators b[1] and b[3] are disposed on a first plane, and the radiators b[2] and b[4] are disposed on a second plane above the first plane. The radiators b[1] and b[2] overlap each other to form a first overlapping region. The radiators b[3] and b[4] overlap each other to form a second overlapping region. Compared to the traditional design, the overlapping design can shrink the size the antenna 300 without impacting its operating frequency on the lower end. In other words, the overlapping design can extend its operating frequency on the lower end compared to the traditional design with the same size of the antenna.

Figure 4A:
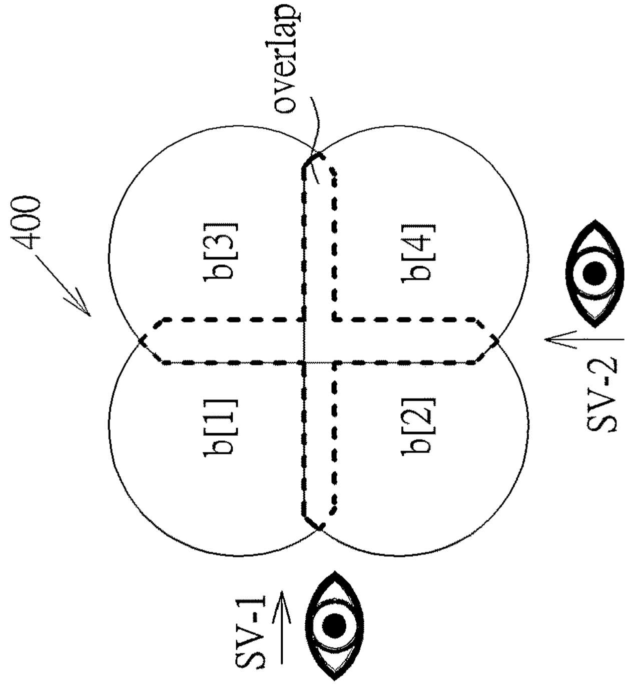
FIG. 4A, FIG. 4B and FIG. 4C depict an antenna according to a different embodiment.
Figure 4B:
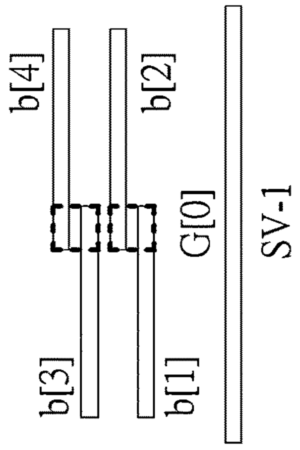
Figure 4C:
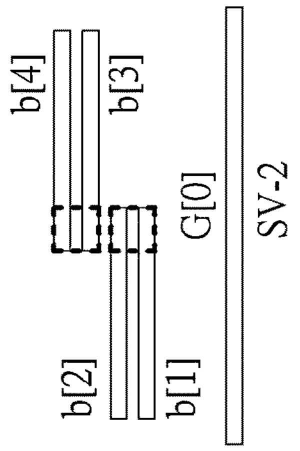

FIG. 4A depicts a top view of an antenna 400 according to an embodiment. FIG. 4B depicts a side view of the antenna 400. FIG. 4C depicts another side view of the antenna 400. The antenna 400 may satisfy demands of advanced multi-band and multi-polarization communication standards, such as 5G mobile telecommunication at two separated FR2 bands with MIMO of dual-polarization diversity. Besides, the antenna 400 may also be compact in size to provide a high bandwidth-to-volume ratio.

The antenna 400 includes radiators b[1], b[2], b[3] and b[4], which are physically separated and insulated from each other. The radiator b[1] is disposed on a first plane; the radiators b[2] is disposed on a second plane above the first plane; the radiator b[3] is disposed on a third plane above the second plane; the radiator b[4] is disposed on a fourth plane above the third plane. The radiators b[1] and b[2] overlap each other to form a first overlapping region. The radiators b[1] and b[3] overlap each other to form a second overlapping region. The radiators b[2] and b[4] overlap each other to form a third overlapping region. The radiators b[3] and b[4] overlap each other to form a fourth overlapping region. The center of the antenna is stacked with all four radiators b[1], b[2], b[3] and b[4].

Compared to the traditional design, the above-described embodiments with overlapping design can shrink the size the antenna without impacting its operating frequency on the lower end. In other words, the overlapping design can extend its operating frequency on the lower end compared to the traditional design with the same size of the antenna. The radiators b[1], b[2], b[3] and b[4] are disposed above a ground plane G[0]. While not drawn to scale, in some embodiments, the radiators b[1], b[2], b[3] and b[4] may be identical or different in size, shape and/or orientation.

Figure 5B:
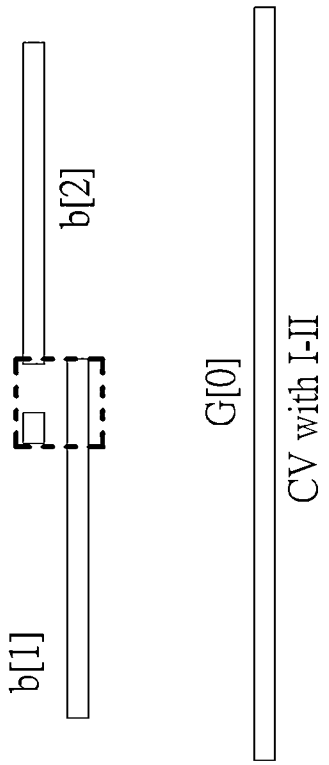
FIG. 5A and FIG. 5B depict an antenna according to a different embodiment.
Figure 5A:
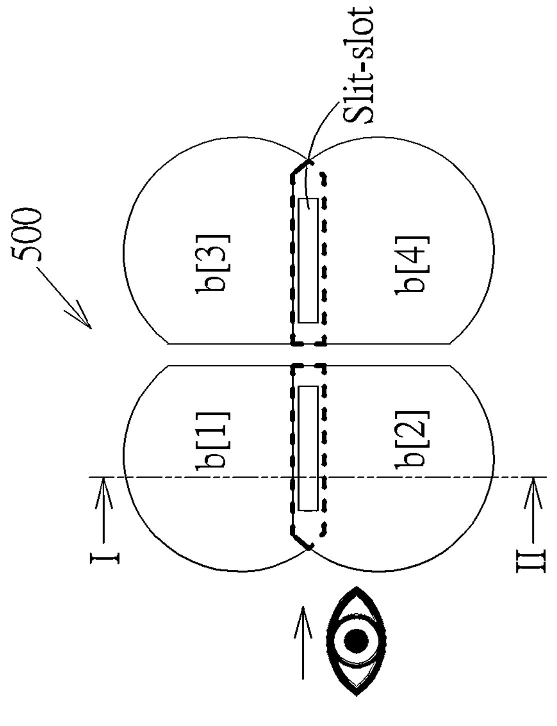

FIG. 5A depicts a top view of an antenna 500 according to an embodiment. FIG. 5B depicts a cross-sectional view (CV) of the antenna 500. The antenna 500 may satisfy demands of advanced multi-band and multi-polarization communication standards, such as 5G mobile telecommunication at two separated FR2 bands with MIMO of dual-polarization diversity. Besides, the antenna 500 may also be compact in size to provide a high bandwidth-to-volume ratio.

The antenna 500 includes radiators b[1], b[2], b[3] and b[4], which are physically separated and insulated from each other. The radiators b[1] and b[3] are disposed on a first plane, and the radiators b[2] and b[4] is disposed on a second plane above the first plane. The radiators b[1] and b[2] overlap each other to form a first overlapping region. The radiators b[3] and b[4] overlap each other to form a second overlapping region. A slit-slot is formed in the first overlapping region on the second plane (i.e., on the radiator b[2]). Another slit-slot is formed in the second overlapping region on the second plane (i.e., on the radiator b[4]). By strategically integrating these slit-slots, a wider operational bandwidth for the antenna can be achieved. This expanded bandwidth translates to effective performance across a larger range of frequency, making the antenna more versatile and adaptable to various applications.

Figure 6B:
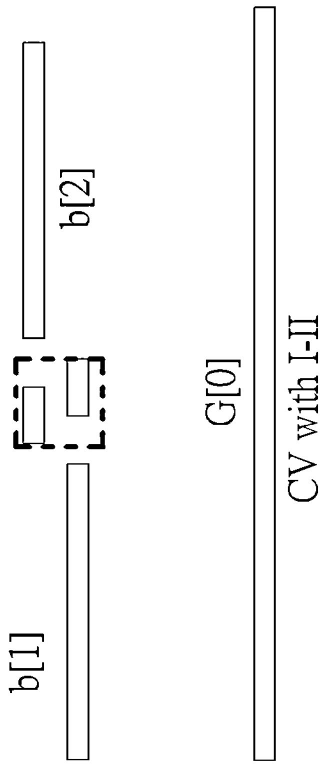
FIG. 6A and FIG. 6B depict an antenna according to a different embodiment.
Figure 6A:
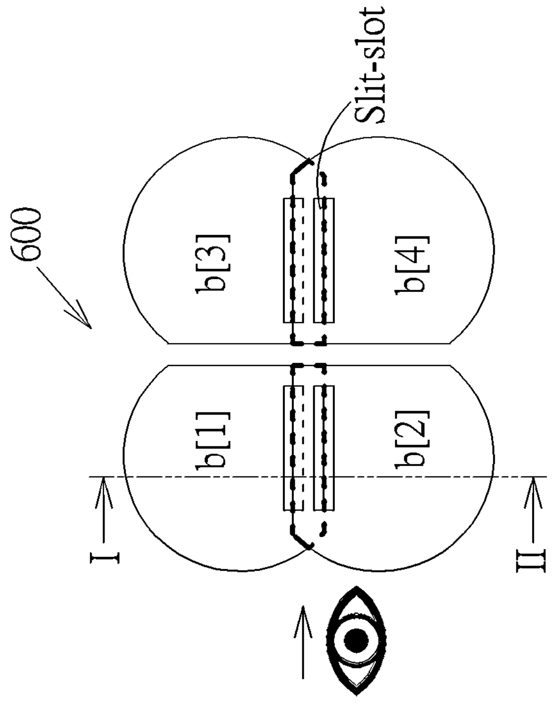

FIG. 6A depicts a top view of an antenna 600 according to an embodiment. FIG. 6B depicts a cross-sectional view of the antenna 600. The antenna 600 may satisfy demands of advanced multi-band and multi-polarization communication standards, such as 5G mobile telecommunication at two separated FR2 bands with MIMO of dual-polarization diversity. Besides, the antenna 600 may also be compact in size to provide a high bandwidth-to-volume ratio.

The antenna 600 includes radiators b[1], b[2], b[3] and b[4], which are physically separated and insulated from each other. The radiators b[1] and b[3] are disposed on a first plane, and the radiators b[2] and b[4] is disposed on a second plane above the first plane. The radiators b[1] and b[2] overlap each other to form a first overlapping region. The radiators b[3] and b[4] overlap each other to form a second overlapping region. A slit-slot is formed in the first overlapping region and extended to a non-overlapping region on both the first plane and the second plane (i.e., on the radiators b[1] and b[2]). Another slit-slot is formed in the second overlapping region and extended to a non-overlapping region on both the first plane and the second plane (i.e., on the radiators b[3] and b[4]). It is not necessary for the slit-slot on the first plane to align with the slit-slot on the second plane. In other words, there may be offsets to the slit-slots on the first plane and the second plane. By strategically integrating these slit-slots, a wider operational bandwidth for the antenna can be achieved. This expanded bandwidth translates to effective performance across a larger range of frequency, making the antenna more versatile and adaptable to various applications.

Figure 7A:
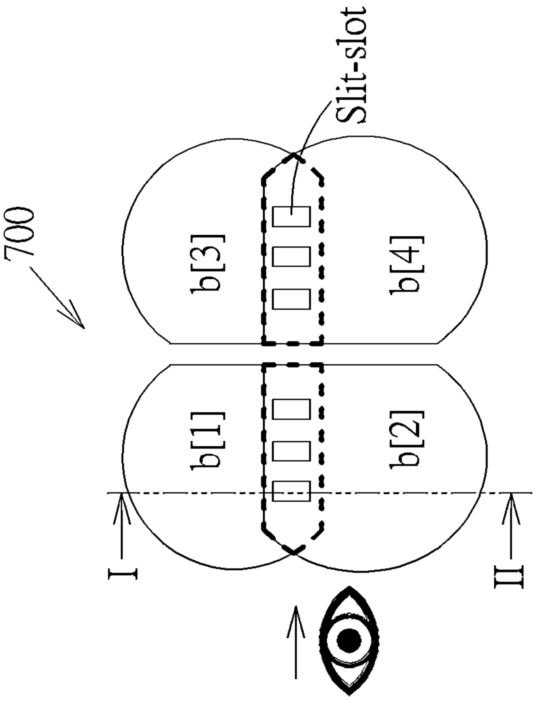
FIG. 7A and FIG. 7B depict an antenna according to a different embodiment.
Figure 7B:
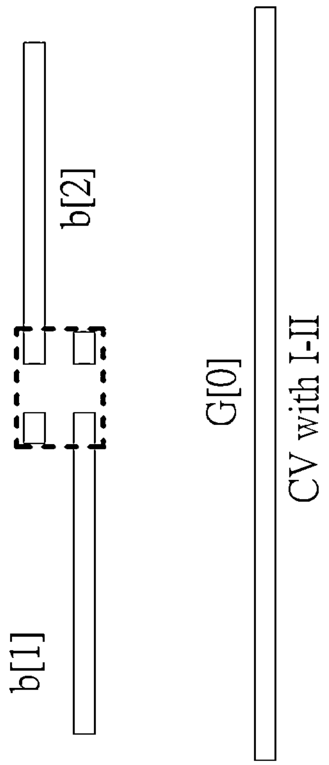

FIG. 7A depicts a top view of an antenna 700 according to an embodiment. FIG. 7B depicts a cross-sectional view of the antenna 700. The antenna 700 may satisfy demands of advanced multi-band and multi-polarization communication standards, such as 5G mobile telecommunication at two separated FR2 bands with MIMO of dual-polarization diversity. Besides, the antenna 700 may also be compact in size to provide a high bandwidth-to-volume ratio.

The antenna 700 includes radiators b[1], b[2], b[3] and b[4], which are physically separated and insulated from each other. The radiators b[1] and b[3] are disposed on a first plane, and the radiators b[2] and b[4] is disposed on a second plane above the first plane. The radiators b[1] and b[2] overlap each other to form a first overlapping region. The radiators b[3] and b[4] overlap each other to form a second overlapping region. A plurality of slit-slots are formed in the first overlapping region on both the first plane and the second plane (i.e., on the radiators b[1] and b[2]). Furthermore, a plurality of slit-slots are formed in the second overlapping region on both the first plane and the second plane (i.e., on the radiators b[3] and b[4]). The slit-slots are formed in parallel looking from the top view. Further, the slit-slots on the first plane are aligned with the slit-slots on the second plane. By strategically integrating these slit-slots, a wider operational bandwidth for the antenna can be achieved. This expanded bandwidth translates to effective performance across a larger range of frequency, making the antenna more versatile and adaptable to various applications.

Compared to the traditional design, the overlapping design can shrink the size the antenna without impacting its operating frequency on the lower end. In other words, the overlapping design can extend its operating frequency on the lower end compared to the traditional design with the same size of the antenna. The radiators b[1], b[2], b[3] and b[4] are disposed above a ground plane G[0]. While not drawn to scale, in some embodiments, the radiators b[1], b[2], b[3] and b[4] may be identical or different in size, shape and/or orientation. Similarly, the slit-slots may be identical or different in size, shape and/or orientation in different embodiments in different embodiments.

Figure 8C:
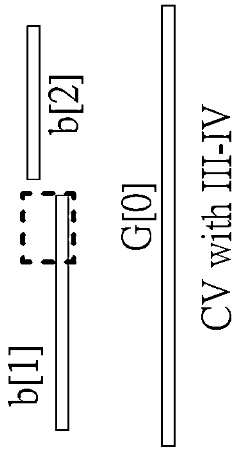
FIG. 8A, FIG. 8B and FIG. 8C depict an antenna according to a different embodiment.
Figure 8B:
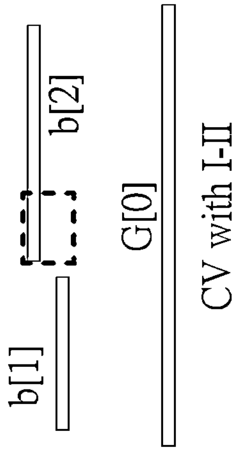
Figure 8A:
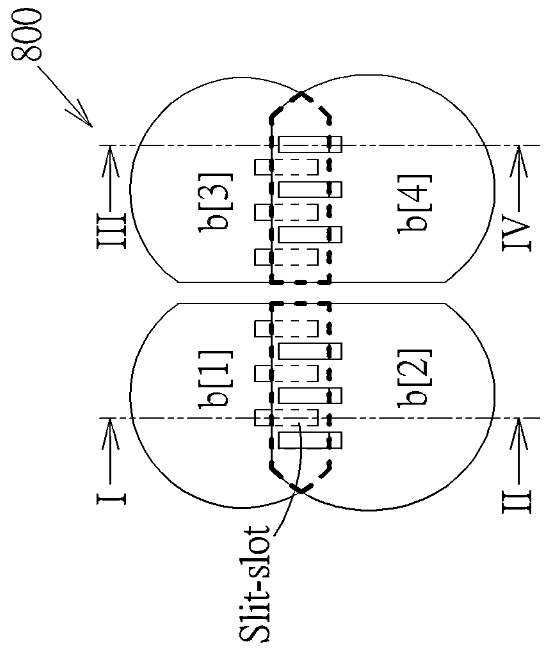

FIG. 8A depicts a top view of an antenna 800 according to an embodiment. FIG. 8B depicts a cross-sectional view of the antenna 800. FIG. 8C depicts another cross-sectional view of the antenna 800. The antenna 800 may satisfy demands of advanced multi-band and multi-polarization communication standards, such as 5G mobile telecommunication at two separated FR2 bands with MIMO of dual-polarization diversity. Besides, the antenna 800 may also be compact in size to provide a high bandwidth-to-volume ratio.

The antenna 800 includes radiators b[1], b[2], b[3] and b[4], which are physically separated and insulated from each other. The radiators b[1] and b[3] are disposed on a first plane, and the radiators b[2] and b[4] is disposed on a second plane above the first plane. The radiators b[1] and b[2] overlap each other to form a first overlapping region. The radiators b[3] and b[4] overlap each other to form a second overlapping region. A first set of slit-slots are formed in the first overlapping region and extended to a non-overlapping region on the first plane (i.e., on the radiators b[1]). A second set of slit-slots are formed in the first overlapping region on the second plane (i.e., on the radiator b[2]). A third set of slit-slots are formed in the second overlapping region and extended to a non-overlapping region on the first plane (i.e., on the radiators b[3]). A fourth set of slit-slots are formed in the second overlapping region and extended to a non-overlapping region on the second plane (i.e., on the radiator b[4]) The slit-slots are formed in parallel looking from the top view. Further, it is not necessary for the slit-slots on the first plane to align with the slit-slots on the second plane. In other words, there may be offsets to the slit-slots on the first plane and the second plane. By strategically integrating these slit-slots, a wider operational bandwidth for the antenna can be achieved. This expanded bandwidth translates to effective performance across a larger range of frequency, making the antenna more versatile and adaptable to various applications.

Compared to the traditional design, the above-described embodiments with overlapping design can shrink the size the antenna without impacting its operating frequency on the lower end. In other words, the overlapping design can extend its operating frequency on the lower end compared to the traditional design with the same size of the antenna. The radiators b[1], b[2], b[3] and b[4] are disposed above a ground plane G[0]. While not drawn to scale, in some embodiments, the radiators b[1], b[2], b[3] and b[4] may be identical or different in size, shape and/or orientation.

Figure 9B:
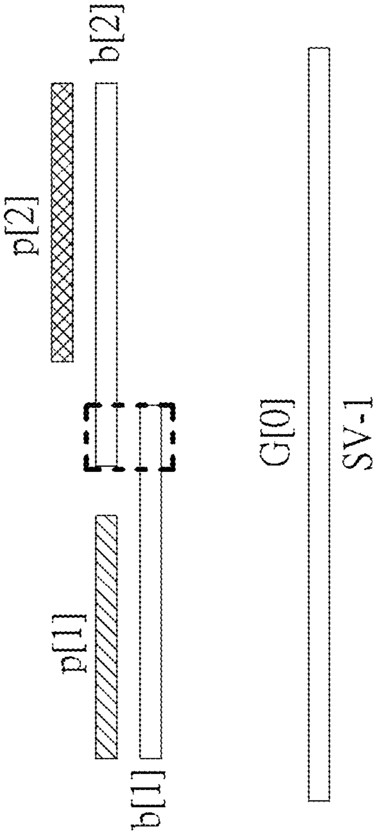
FIG. 9A and FIG. 9B depict an antenna according to a different embodiment.
Figure 9A:
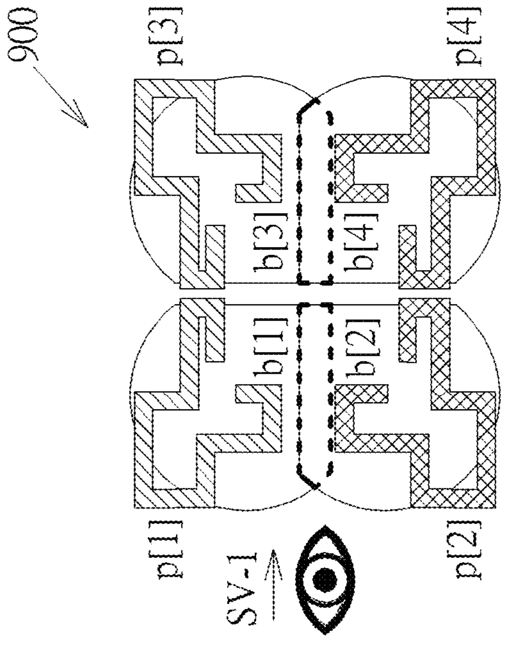

FIG. 9A depicts a top view of an antenna 900 according to an embodiment. FIG. 9B depicts a side view (SV−1) of the antenna 900. The antenna 900 may satisfy demands of advanced multi-band and multi-polarization communication standards, such as 5G mobile telecommunication at two separated FR2 bands with MIMO of dual-polarization diversity. Besides, the antenna 900 may also be compact in size to provide a high bandwidth-to-volume ratio.

The antenna 900 includes radiators b[1], b[2], b[3] and b[4], which are physically separated and insulated from each other. The radiators b[1] and b[3] are disposed on a first plane, and the radiators b[2] and b[4] are disposed on a second plane above the first plane. The radiators b[1] and b[2] overlap each other to form a first overlapping region. The radiators b[3] and b[4] overlap each other to form a second overlapping region.

The antenna 900 further includes parasitic components p[1], p[2], p[3] and p[4], positionally corresponding to the radiators b[1], b[2], b[3] and b[4], respectively. The parasitic components p[1], p[2], p[3] and p[4] are physically separated and insulated from each other, and they may each have a ring shape. In addition, the parasitic components p[1] and p[3] can be disposed on a third plane above the first plane. The parasitic components p[2] and p[4] likewise can be disposed on the fourth plane above the radiators b[1] and b[3]. The parasitic components p[1], p[2], p[3] and p[4] can function individually and/or jointly to enhance performances of the antenna 900 (e.g., to expand bandwidth, to improve impedance matching, to reduce undesired tilt of radiation directivity and/or to increase XPD, etc.), as they allow for the manipulation of the characteristics of the antenna without the need for additional feed points or complex feeding networks. By carefully selecting the size, spacing, and orientation of the parasitic components, the antenna's performance can be optimized for specific applications.

Figure 10B:
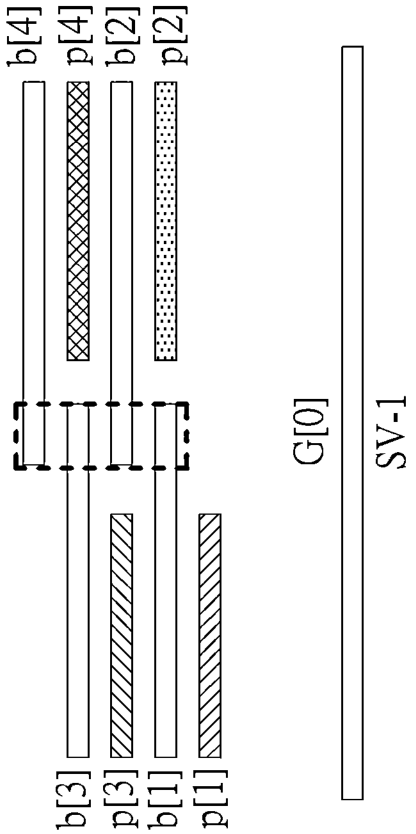
FIG. 10A and FIG. 10B depict an antenna according to a different embodiment.
Figure 10A:
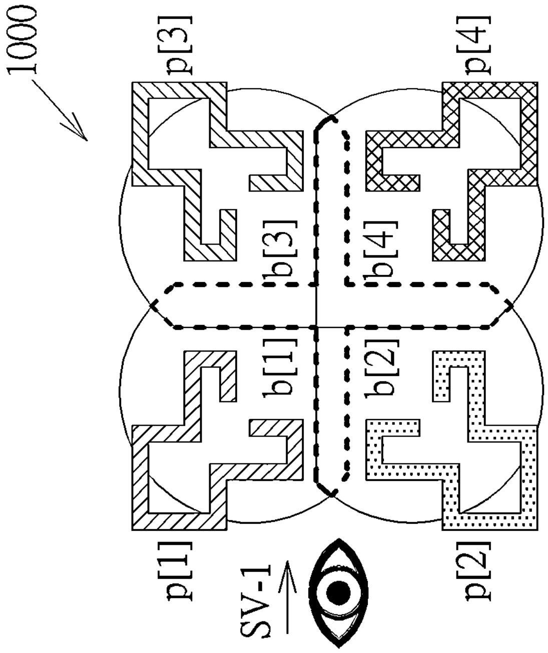

FIG. 10A depicts a top view of an antenna 1000 according to an embodiment. FIG. 10B depicts a side view of the antenna 1000. The antenna 1000 may satisfy demands of advanced multi-band and multi-polarization communication standards, such as 5G mobile telecommunication at two separated FR2 bands with MIMO of dual-polarization diversity. Besides, the antenna 1000 may also be compact in size to provide a high bandwidth-to-volume ratio.

The antenna 1000 includes radiators b[1], b[2], b[3] and b[4], which are physically separated and insulated from each other. The radiators b[1] is disposed on a first plane; the radiator b[2] is disposed on a second plane above the first plane; the radiator b[3] is disposed on a third plane above the second plane; the radiator b[4] is disposed on a fourth plane above the third plane. The radiators b[1] and b[2] overlap each other to form a first overlapping region. The radiators b[1] and b[3] overlap each other to form a second overlapping region. The radiators b[2] and b[4] overlap each other to form a third overlapping region. The radiators b[3] and b[4] overlap each other to form a fourth overlapping region. The center of the antenna is stacked with all four radiators b[1], b[2], b[3] and b[4].

The antenna 1000 further includes parasitic components p[1], p[2], p[3] and p[4], positionally corresponding to the radiators b[1], b[2], b[3] and b[4], respectively. The parasitic components p[1], p[2], p[3] and p[4] are physically separated and insulated from each other, and they may each have a ring shape. In addition, the parasitic components p[1] can be disposed on a fifth plane below the first plane. The parasitic components p[2] can be disposed on the first plane on the same layer as radiator b[1]. The parasitic components p[3] can be disposed on the second plane on the same layer as radiator b[2]. The parasitic components p[4] can be disposed on the third plane on the same layer as radiator b[3]. The parasitic components p[1], p[2], p[3] and p[4] can function individually and/or jointly to enhance performances of the antenna 1000 (e.g., to expand bandwidth, to improve impedance matching, to reduce undesired tilt of radiation directivity and/or to increase XPD, etc.), as they allow for the manipulation of the characteristics of the antenna without the need for additional feed points or complex feeding networks. By carefully selecting the size, spacing, and orientation of the parasitic elements, the antenna's performance can be optimized for specific applications.

Figure 11B:
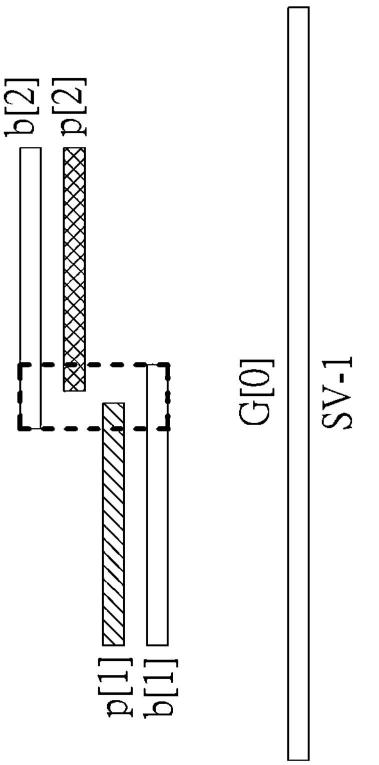
FIG. 11A and FIG. 11B depict an antenna according to a different embodiment.
Figure 11A:
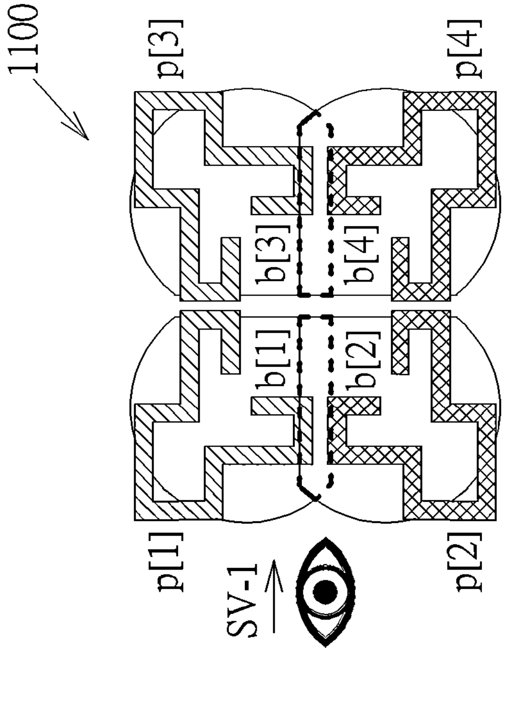

FIG. 11A depicts a top view of an antenna 1100 according to an embodiment. FIG. 11B depicts a side view of the antenna 1100. The antenna 1100 may satisfy demands of advanced multi-band and multi-polarization communication standards, such as 5G mobile telecommunication at two separated FR2 bands with MIMO of dual-polarization diversity. Besides, the antenna 1100 may also be compact in size to provide a high bandwidth-to-volume ratio.

The antenna 1100 includes radiators b[1], b[2], b[3] and b[4], which are physically separated and insulated from each other. The radiators b[1] and b[3] are disposed on a first plane, and the radiators b[2] and b[4] are disposed on a second plane above the first plane. The radiators b[1] and b[2] overlap each other to form a first overlapping region. The radiators b[3] and b[4] overlap each other to form a second overlapping region.

The antenna 1100 further includes parasitic components p[1], p[2], p[3] and p[4], positionally corresponding to the radiators b[1], b[2], b[3] and b[4], respectively. The parasitic components p[1], p[2], p[3] and p[4] are physically separated and insulated from each other, and they may each have a ring shape. In addition, the parasitic components p[1] and p[3] can be disposed on a third plane above the first plane. The parasitic components p[2] and p[4] can be disposed on the fourth plane below the second plane. Furthermore, the parasitic components p[1] and p[2] can be extended to the first overlapping region, and the parasitic components p[3] and p[4] can be extended to the second overlapping region. The parasitic components p[1], p[2], p[3] and p[4] can function individually and/or jointly to enhance performances of the antenna 1100 (e.g., to expand bandwidth, to improve impedance matching, to reduce undesired tilt of radiation directivity and/or to increase XPD, etc.), as they allow for the manipulation of the characteristics of the antenna without the need for additional feed points or complex feeding networks. By carefully selecting the size, spacing, and orientation of the parasitic elements, the antenna's performance can be optimized for specific applications.

Compared to the traditional design, the above-described embodiments with overlapping design can shrink the size the antenna without impacting its operating frequency on the lower end. In other words, the overlapping design can extend its operating frequency on the lower end compared to the traditional design with the same size of the antenna. The radiators b[1], b[2], b[3] and b[4] and the parasitic components p[1], p[2], p[3] and p[4] are disposed above a ground plane G[0]. While not drawn to scale, in some embodiments, the radiators b[1], b[2], b[3] and b[4] may be identical or different in size, shape and/or orientation. Similarly, the parasitic components p[1], p[2], p[3] and p[4] may be identical or different in size, shape and/or orientation in different embodiments.

Figure 12A:
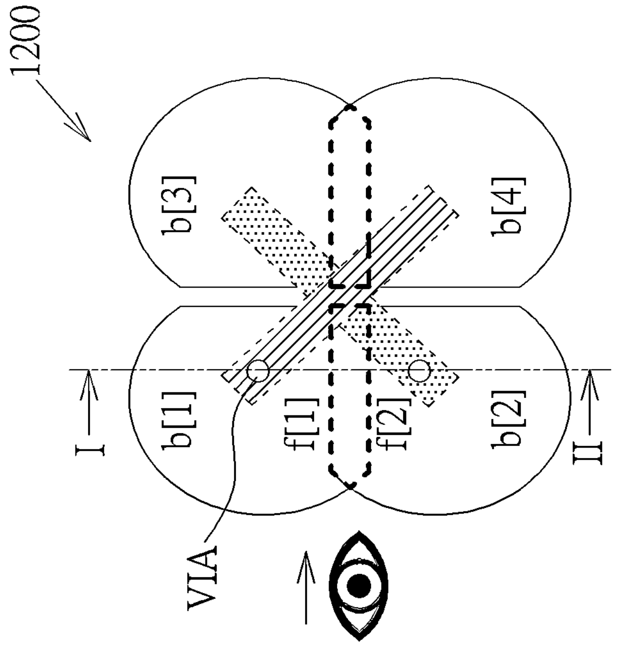
FIG. 12A and FIG. 12B depict an antenna according to a different embodiment.
Figure 12B:
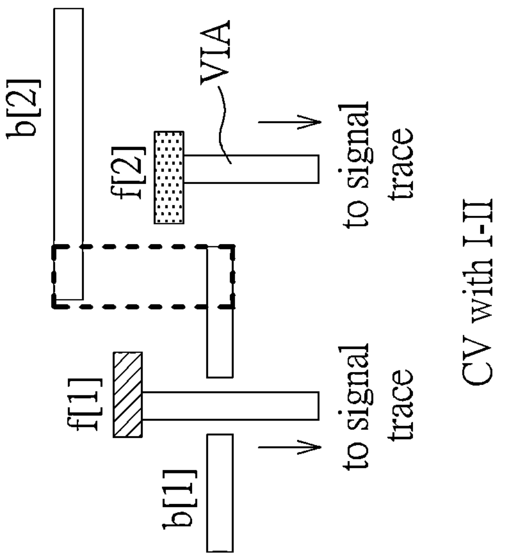

FIG. 12A depicts a top view of an antenna 1200 according to an embodiment. FIG. 12B depicts a cross-sectional view (CV) of the antenna 1200. The antenna 1200 may satisfy demands of advanced multi-band and multi-polarization communication standards, such as 5G mobile telecommunication at two separated FR2 bands with MIMO of dual-polarization diversity. Besides, the antenna 1200 may also be compact in size to provide a high bandwidth-to-volume ratio.

The antenna 1200 includes radiators b[1], b[2], b[3] and b[4], which are physically separated and insulated from each other. The radiators b[1] and b[3] are disposed on a first plane, and the radiators b[2] and b[4] is disposed on a second plane above the first plane. The radiators b[1] and b[2] overlap each other to form a first overlapping region. The radiators b[3] and b[4] overlap each other to form a second overlapping region.

The antenna 1200 further includes feeding components f[1] and f[2], physically separated and insulated from each other. They are disposed in a slanted position relative to an edge near the center of the radiator b[1] to b[4] (i.e., the longer edge of the overlapping region). Each feeding component f[1] and f[2] is coupled to a respective signal trace through a via. The feeding component f[1] can be disposed on a third plane between the first plane (i.e., the radiator b[1]) and the second plane (i.e., the radiator b[2]). The feeding component f[2] can be disposed on a fourth plane between the first plane (i.e., the radiator b[1]) and the third plane (i.e., the feeding component f[1]). From the top view, the feeding components f[1] and f[2] overlap each other to form a 90 degree angle between them.

The feeding components f[1] and f[2] in the antenna 1200 are critical for optimal performance. They act as the bridge between the antenna and the radio source, ensuring efficient signal transfer.

The feeding components f[1] and f[2] can be designed to minimize signal loss by achieving impedance matching, where most of the power from the transmitter or receiver reaches the antenna. The feeding components f[1] and f[2] can also influences shaping the radiation pattern and polarization of the waves. Additionally, the design of the feeding components f[1] and f[2] can affect the bandwidth of the antenna 1200, allowing it to operate efficiently within a desired ranges of frequency.

Figure 13B:
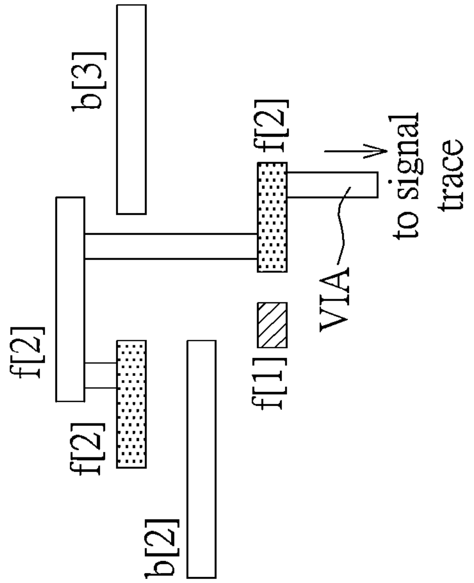
FIG. 13A and FIG. 13B depict an antenna according to a different embodiment.
Figure 13A:
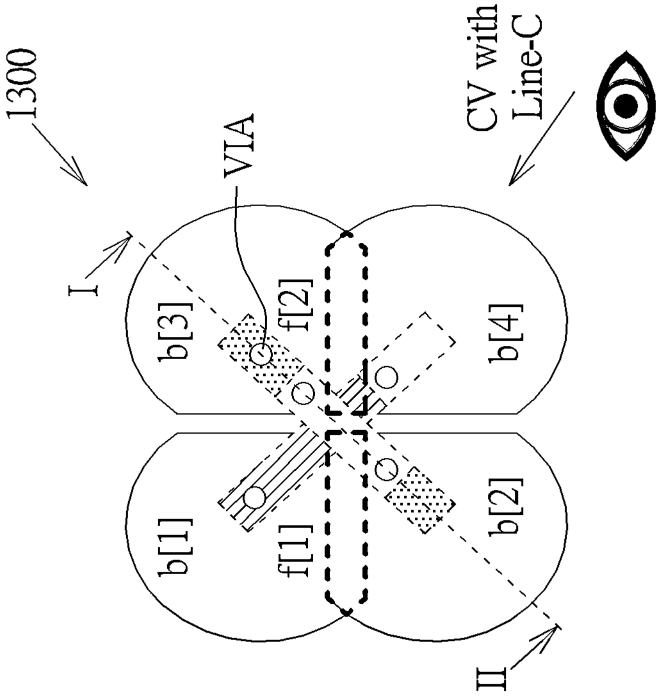

FIG. 13A depicts a top view of an antenna 1300 according to an embodiment. FIG. 13B depicts a cross-sectional view of the antenna 1300. The antenna 1300 may satisfy demands of advanced multi-band and multi-polarization communication standards, such as 5G mobile telecommunication at two separated FR2 bands with MIMO of dual-polarization diversity. Besides, the antenna 1300 may also be compact in size to provide a high bandwidth-to-volume ratio.

The antenna 1300 includes radiators b[1], b[2], b[3] and b[4], which are physically separated and insulated from each other. Different from the previous embodiments, the radiators b[2] and b[4] are disposed on a first plane, and the radiators b[1] and b[3] are disposed on a second plane above the first plane. The radiators b[1] and b[2] overlap each other to form a first overlapping region. The radiators b[3] and b[4] overlap each other to form a second overlapping region.

The antenna 1300 further includes feeding components f[1] and f[2], physically separated and insulated from each other. They are disposed in a slanted position relative to an edge near the center of the radiator b[1] to b[4] (i.e., the longer edge of the overlapping region). Each feeding component f[1] and f[2] is coupled to a respective signal trace through a via. The feeding component f[1] can be disposed on a third plane below the first plane (i.e., the radiator b[2]). The feeding component f[2] can be disposed on different planes, e.g., the second plane, the third plane and a fourth plane above the second plane. Each part of the feeding component f[2] on the different planes can coupled with vias, as shown in FIG. 13B. From the top view, the feeding components f[1] and f[2] overlap each other to form a 90 degree angle between them.

The feeding components f[1] and f[2] in the antenna 1300 are critical for optimal performance. They act as the bridge between the antenna and the radio source, ensuring efficient signal transfer. The feeding components f[1] and f[2] can be designed to minimize signal loss by achieving impedance matching, where most of the power from the transmitter or receiver reaches the antenna. The feeding components f[1] and f[2] can also influences shaping the radiation pattern and polarization of the waves. Additionally, the design of the feeding components f[1] and f[2] can affect the bandwidth of the antenna 1300, allowing it to operate efficiently within a desired ranges of frequency.

Figure 14:
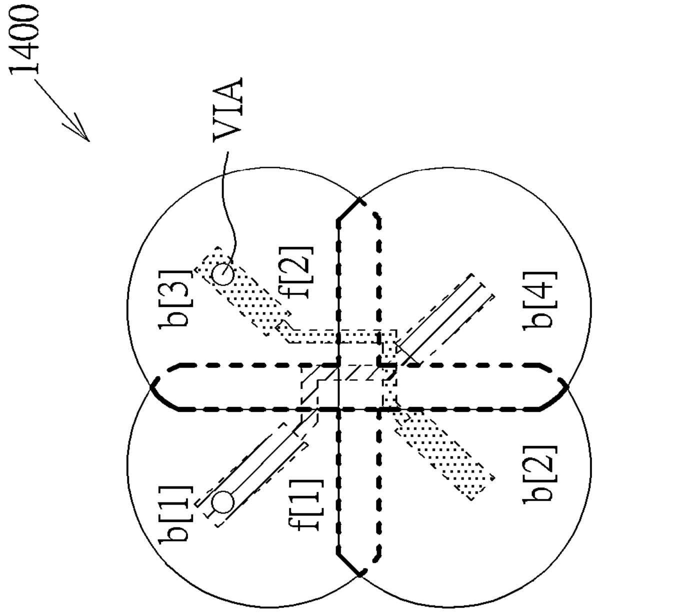
FIG. 14 depicts an antenna according to a different embodiment.

FIG. 14 depicts a top view of an antenna 1400 according to an embodiment. The antenna 1400 may satisfy demands of advanced multi-band and multi-polarization communication standards, such as 5G mobile telecommunication at two separated FR2 bands with MIMO of dual-polarization diversity. Besides, the antenna 1400 may also be compact in size to provide a high bandwidth-to-volume ratio.

The antenna 1400 includes radiators b[1], b[2], b[3] and b[4], which are physically separated and insulated from each other. The radiator b[1] is disposed on a first plane; the radiator b[2] is disposed on a second plane above the first plane; the radiator b[3] is disposed on a third plane above the second plane; the radiator b[4] is disposed on a fourth plane above the third plane. The radiators b[1] and b[2] overlap each other to form a first overlapping region. The radiators b[1] and b[3] overlap each other to form a second overlapping region. The radiators b[2] and b[4] overlap each other to form a third overlapping region. The radiators b[3] and b[4] overlap each other to form a fourth overlapping region. The center of the antenna is stacked with all four radiators b[1], b[2], b[3] and b[4].

The antenna 1400 further includes feeding components f[1] and f[2], physically separated and insulated from each other. They are disposed in a slanted position relative to an edge near the center of the radiator b[1] to b[4] (i.e., the longer edge of the overlapping region). Each feeding component f[1] and f[2] is coupled to a respective signal trace through a via. As shown in FIG. 14, the feeding component f[1] and f[2] can have different widths and meander trace shape for fine tuning the resonance characteristics of the antenna 1400.

The feeding components f[1] and f[2] in the antenna 1400 are critical for optimal performance. They act as the bridge between the antenna and the radio source, ensuring efficient signal transfer. The feeding components f[1] and f[2] can be designed to minimizes signal loss by achieving impedance matching, where most of the power from the transmitter or receiver reaches the antenna. The feeding components f[1] and f[2] can also influences shaping the radiation pattern and polarization of the waves. Additionally, the design of the feeding components f[1] and f[2] can affect the bandwidth of the antenna 1400, allowing it to operate efficiently within a desired ranges of frequency.

Figure 15:
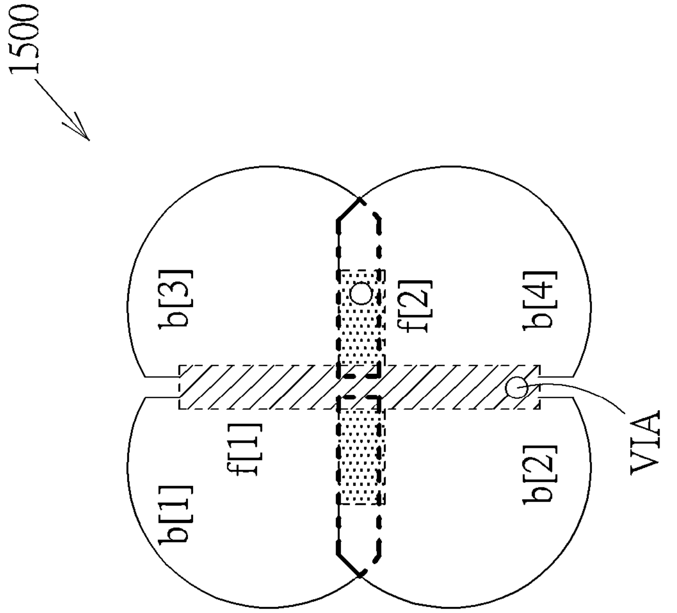
FIG. 15 depicts an antenna according to a different embodiment.

FIG. 15 depicts a top view of an antenna 1500 according to an embodiment. The antenna 1500 may satisfy demands of advanced multi-band and multi-polarization communication standards, such as 5G mobile telecommunication at two separated FR2 bands with MIMO of dual-polarization diversity. Besides, the antenna 1500 may also be compact in size to provide a high bandwidth-to-volume ratio.

The antenna 1500 includes radiators b[1], b[2], b[3] and b[4], which are physically separated and insulated from each other. The radiators b[1] and b[3] are disposed on a first plane, and the radiators b[2] and b[4] is disposed on a second plane above the first plane. The radiators b[1] and b[2] overlap each other to form a first overlapping region. The radiators b[3] and b[4] overlap each other to form a second overlapping region.

The antenna 1500 further includes feeding components f[1] and f[2], physically separated and insulated from each other. The configuration of the feeding components f[1] and f[2] are similar to that of the antenna 1200, except the position being rotated by approximately 45 degrees. The feeding component f[1] is disposed in parallel to an edge near the center of the radiator b[1] to b[4] (i.e., the longer edge of the overlapping region). The feeding component f[2] is disposed in parallel to another of the radiator b[1] to b[4]. Each feeding component f[1] and f[2] is coupled to a respective signal trace through a via.

The feeding components f[1] and f[2] in the antenna 1500 are critical for optimal performance. They act as the bridge between the antenna and the radio source, ensuring efficient signal transfer. The feeding components f[1] and f[2] can be designed to minimizes signal loss by achieving impedance matching, where most of the power from the transmitter or receiver reaches the antenna. The feeding components f[1] and f[2] can also influences shaping the radiation pattern and polarization of the waves. Additionally, the design of the feeding components f[1] and f[2] can affect the bandwidth of the antenna 1500, allowing it to operate efficiently within a desired ranges of frequency.

Figure 16:
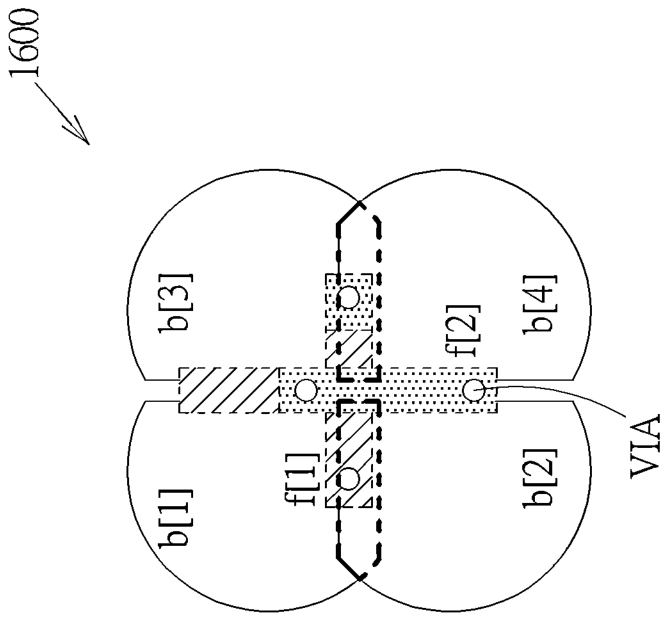
FIG. 16 depicts an antenna according to a different embodiment.

FIG. 16 depicts a top view of an antenna 1600 according to an embodiment. The antenna 1600 may satisfy demands of advanced multi-band and multi-polarization communication standards, such as 5G mobile telecommunication at two separated FR2 bands with MIMO of dual-polarization diversity. Besides, the antenna 1600 may also be compact in size to provide a high bandwidth-to-volume ratio.

The antenna 1600 includes radiators b[1], b[2], b[3] and b[4], which are physically separated and insulated from each other. The radiators b[1] and b[3] are disposed on a first plane, and the radiators b[2] and b[4] is disposed on a second plane above the first plane. The radiators b[1] and b[2] overlap each other to form a first overlapping region. The radiators b[3] and b[4] overlap each other to form a second overlapping region.

The antenna 1600 further includes feeding components f[1] and f[2], physically separated and insulated from each other. The configuration of the feeding components f[1] and f[2] are similar to that of the antenna 1300, except the position being rotated by approximately 45 degrees. The feeding component f[1] is disposed in parallel to an of the radiator b[1] to b[4], and the feeding component f[2] is disposed in parallel to another of the radiator b[1] to b[4]. Each feeding component f[1] and f[2] is coupled to a respective signal trace through a via.

The feeding components f[1] and f[2] in the antenna 1600 are critical for optimal performance. They act as the bridge between the antenna and the radio source, ensuring efficient signal transfer. The feeding components f[1] and f[2] can be designed to minimizes signal loss by achieving impedance matching, where most of the power from the transmitter or receiver reaches the antenna. The feeding components f[1] and f[2] can also influences shaping the radiation pattern and polarization of the waves. Additionally, the design of the feeding components f[1] and f[2] can affect the bandwidth of the antenna 1600, allowing it to operate efficiently within a desired ranges of frequency.

Figure 17A:
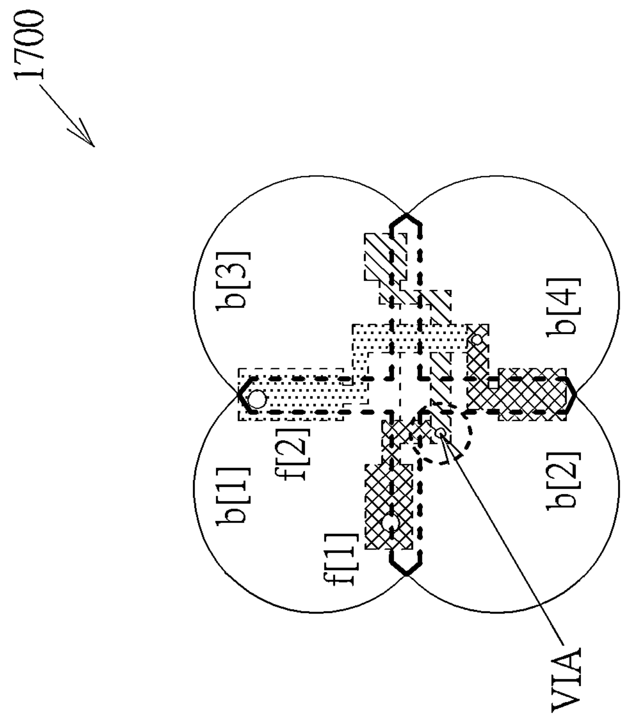
FIG. 17A and FIG. 17B depict an antenna according to a different embodiment.
Figure 17B:
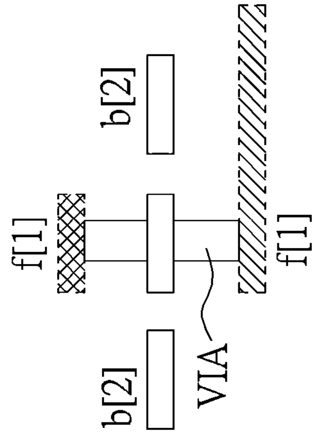

FIG. 17A depicts a top view of an antenna 1700 according to an embodiment. FIG. 17B depicts a partial exploded view of the coupling relationship of a via on a radiator b[2] of the antenna 1700 according to an embodiment. The antenna 1700 may satisfy demands of advanced multi-band and multi-polarization communication standards, such as 5G mobile telecommunication at two separated FR2 bands with MIMO of dual-polarization diversity. Besides, the antenna 1700 may also be compact in size to provide a high bandwidth-to-volume ratio.

The antenna 1700 includes radiators b[1], b[2], b[3] and b[4], which are physically separated and insulated from each other. The radiator b[1] is disposed on a first plane; the radiator b[2] is disposed on a second plane above the first plane; the radiator b[3] is disposed on a third plane above the second plane; the radiator b[4] is disposed on a fourth plane above the third plane. The radiators b[1] and b[2] overlap each other to form a first overlapping region. The radiators b[1] and b[3] overlap each other to form a second overlapping region. The radiators b[2] and b[4] overlap each other to form a third overlapping region. The radiators b[3] and b[4] overlap each other to form a fourth overlapping region. The center of the antenna is stacked with all four radiators b[1], b[2], b[3] and b[4].

The antenna 1700 further includes feeding components f[1] and f[2], physically separated and insulated from each other. The configuration of the feeding components f[1] and f[2] are similar to that of the antenna 1400, except the position being rotated by approximately 45 degrees. The feeding components f[1] and f[2] can form meander trace shape for fine tuning the resonance characteristics of the antenna. Each feeding component f[1] and f[2] is coupled to a respective signal trace through a via.

The feeding components f[1] and f[2] in the antenna 1700 are critical for optimal performance. They act as the bridge between the antenna and the radio source, ensuring efficient signal transfer. The feeding components f[1] and f[2] can be designed to minimizes signal loss by achieving impedance matching, where most of the power from the transmitter or receiver reaches the antenna. The feeding components f[1] and f[2] can also influences shaping the radiation pattern and polarization of the waves. Additionally, the design of the feeding components f[1] and f[2] can affect the bandwidth of the antenna 1700, allowing it to operate efficiently within a desired ranges of frequency.

Compared to the traditional design, the above-described embodiments with overlapping design can shrink the size the antenna without impacting its operating frequency on the lower end. In other words, the overlapping design can extend its operating frequency on the lower end compared to the traditional design with the same size of the antenna. The radiators b[1], b[2], b[3] and b[4] are disposed above a ground plane G[0]. While not drawn to scale, in some embodiments, the radiators b[1], b[2], b[3] and b[4] may be identical or different in size, shape and/or orientation. Similarly, the feeding components f[1] and f[2] may be identical or different in size, shape and/or orientation in different embodiments.

Figure 18A:
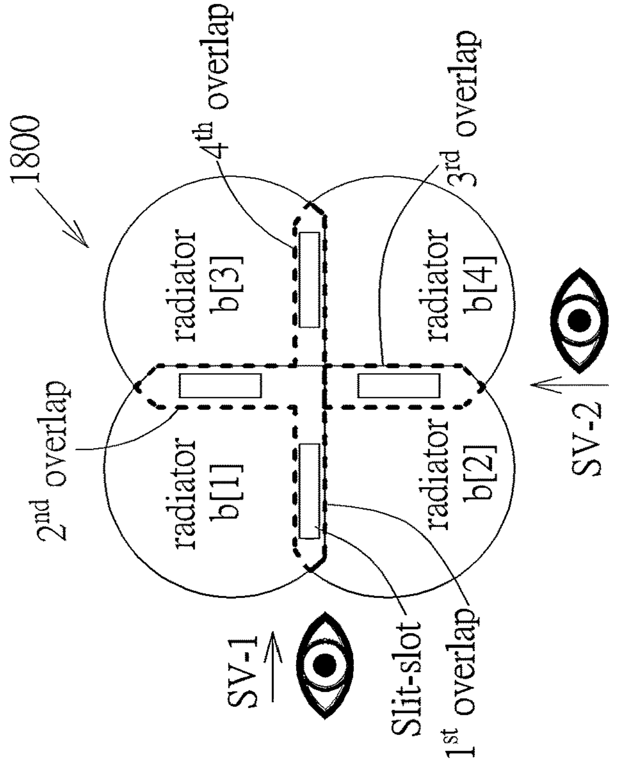
FIG. 18A, FIG. 18B and FIG. 18C depict an antenna according to a different embodiment.
Figure 18B:
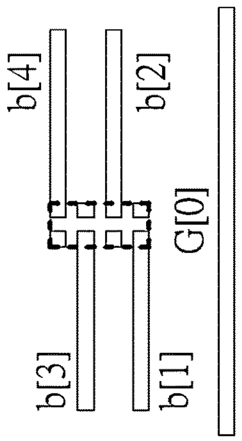
Figure 18C:
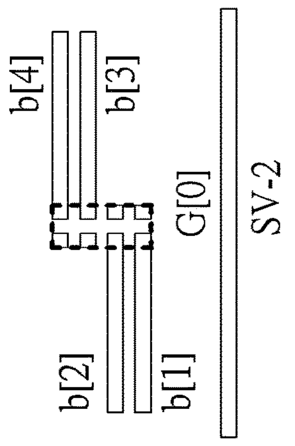

FIG. 18A depicts a top view of an antenna 1800 according to an embodiment. FIG. 18B depicts a side view of the antenna 1800. FIG. 18C depicts another side view of the antenna 1800. The antenna 1800 may satisfy demands of advanced multi-band and multi-polarization communication standards, such as 5G mobile telecommunication at two separated FR2 bands with MIMO of dual-polarization diversity. Besides, the antenna 1800 may also be compact in size to provide a high bandwidth-to-volume ratio.

The antenna 1800 includes radiators b[1], b[2], b[3] and b[4], which are physically separated and insulated from each other. The radiator b[1] is disposed on a first plane; the radiator b[2] is disposed on a second plane above the first plane; the radiator b[3] is disposed on a third plane above the second plane; the radiator b[4] is disposed on a fourth plane above the third plane. The radiators b[1] and b[2] overlap each other to form a first overlapping region. The radiators b[1] and b[3] overlap each other to form a second overlapping region. The radiators b[2] and b[4] overlap each other to form a third overlapping region. The radiators b[3] and b[4] overlap each other to form a fourth overlapping region. The center of the antenna is stacked with all four radiators b[1] to b[4].

In addition to the radiators b[1] to b[4], a slit-slot can be formed in each overlapping region on the first plane, the second plane, the third plane and/or the fourth plane. As shown in the FIGS. 18A, 18B and 18C, a slit-slot can be formed in the first overlapping region on the first plane and second plane, and another slit-slot can be formed in the fourth overlapping region on the third plane and the fourth plane.

The incorporation of slit-slots within antenna design offers several distinct advantages that enhance overall functionality. One primary benefit lies in their ability to manipulate bandwidth. By strategically integrating these slit-slots, a wider operational bandwidth for the antenna can be achieved. This expanded bandwidth translates to effective performance across a larger range of frequency, making the antenna more versatile and adaptable to various applications.

The slit-slots also provide precise control over polarization, which is essential in applications requiring a specific orientation for optimal signal transmission or reception. The design of the slots tailors the radiated wave's polarization to meet these specific requirements.

Compared to the traditional design, the overlapping design can shrink the size the antenna without impacting its operating frequency on the lower end. In other words, the overlapping design can extend its operating frequency on the lower end compared to the traditional design with the same size of the antenna. The radiators b[1], b[2], b[3] and b[4] are disposed above a ground plane G[0]. While not drawn to scale, in some embodiments, the radiators b[1], b[2], b[3] and b[4] may be identical or different in size, shape and/or orientation. Similarly, the slit-slots may be identical or different in size, shape and/or orientation in different embodiments in different embodiments.

The present disclosure introduced embodiments of a compact multi-band antenna structure that offers a space-efficient solution for devices requiring operation in multiple frequency bands. By employing a layered construction approach, the antenna can be designed to occupy minimal space while maintaining its performance across different frequency ranges. This compact design makes the antenna particularly attractive for use in portable communication devices, where size constraints are a primary concern.

The compact multi-band antenna presented in this disclosure addresses this need of supporting multiple frequency bands to accommodate various applications, such as cellular networks, Wi-Fi, Bluetooth, and GPS, by providing a single antenna structure capable of transmitting and receiving signals across multiple frequency bands. The provided solution eliminates the necessity for separate antennas for each frequency band, thereby reducing the overall space required within the device.

The space-efficient implementation of the antenna is achieved through its layered construction. By stacking several layers or planes, the antenna can be designed to fit within a small form factor without compromising its performance. This approach is particularly beneficial for portable devices, such as smartphones, tablets, and wearables, where space is at a premium. The compact multi-band antenna enables these devices to support multiple wireless technologies while maintaining a sleek and compact design.

The compact nature of the antenna makes it an ideal solution for applications where size constraints are a primary concern. As device manufacturers strive to reduce the size and weight of their products while enhancing functionality, the compact multi-band antenna offers a promising solution. By providing multi-band operation in a small form factor, this antenna structure allows manufacturers to incorporate multiple wireless capabilities into their devices without significantly increasing the overall size or complexity.

In summary, the compact multi-band antenna structure presented in this disclosure offers a space-efficient solution for devices requiring operation in multiple frequency bands. Its overlapping layered construction approach enables the antenna to be designed in a compact form factor, making it particularly suitable for portable communication devices where size constraints are a primary concern. By providing multi-band transmit and receive capabilities in a single, compact antenna structure, this design addresses the growing need for devices to support multiple wireless technologies while maintaining a sleek and portable form factor.

In the description above, embodiments of the multi-band, multi-polarization antenna is discussed as having a plurality of planes or layers. It should be noted that the term "layer" or "planes" is intended to encompass both conductive and non-conductive materials depending on the implementation.

The techniques and structures of the present disclosure may be implemented in any of a variety of different forms. For example, features of the invention may be embodied within cellular phones and other handheld wireless communicators, laptop, and tablet computers having wireless capability, satellite communicators, cameras having wireless capability, audio/video devices having wireless capability, network cards and other network interface structures, integrated circuits, and/or in other formats.

It should be appreciated that the words "first," "second," "third," "fourth," etc., are used in the claims and descriptions for the purpose of identifying and distinguishing between elements having the same base name. These words are not intended to indicate a particular order or physical orientation of the elements. Likewise, these words are not intended to indicate a specific temporal relationship between elements. In the claims, the words will typically be assigned in the order that elements are introduced, which may not be the same as the order assigned in the description.

Certain terms are used throughout the description and following claims to refer to particular elements. As one skilled in the art will understand, electronic equipment manufacturers may refer to an element by different names. This document does not intend to distinguish between elements that differ in name but not function. In the following description and in the claims, the terms "comprise", "include" and "have" are used in an open-ended fashion, and thus should be interpreted to mean "include, but not limited to".

The direction terms used in the following embodiment such as up, down, left, right, in front of or behind are just the directions referring to the attached figures. Thus, the direction terms used in the present disclosure are for illustration, and are not intended to limit the scope of the present disclosure. It should be noted that the elements which are specifically described or labeled may exist in various forms for those skilled in the art. Besides, when a layer is referred to as being "on" another layer or substrate, it may be directly on the other layer or substrate, or may be on the other layer or substrate, or intervening layers may be included between other layers or substrates.

Besides, relative terms such as "lower" or "bottom", and "higher" or "top", "above" or "below" may be used in embodiments to describe the relative relation of an element to another element labeled in figures. It should be understood that if the labeled device is flipped upside down, the element in the "lower" side may be the element in the "higher" side.

The terms of approximation, such as "generally" and "substantially," are descriptive terms used herein to avoid a strict numerical boundary to the specified parameter and are generally interpreted as being within a certain given value or range.

In the foregoing detailed description, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An antenna for multi-band communication, comprising:

a plurality of radiators, physically separated, each disposed on different planes, configured to jointly function as one or more dipoles;

wherein a top radiator and a bottom radiator of the plurality of radiators partially overlap each other to form an overlapping region; and a slit-slot is formed in the overlapping region.

2. The antenna of claim 1, wherein the slit-slot is formed in the overlapping region and extended to a non-overlapping region.

3. The antenna of claim 1, wherein the slit-slot is formed in the overlapping region and on the bottom radiator.

4. The antenna of claim 1, wherein the slit-slot is formed in the overlapping region and on the top radiator.

5. The antenna of claim 1, wherein the slit-slot is formed in the overlapping region and on both the top radiator and the bottom radiator.

6. The antenna of claim 1, further comprising a plurality of parasitic components, each having an open ring shape and insulated from the plurality of radiators, configured to tune a bandwidth of the antenna.

7. The antenna of claim 6, wherein one of the plurality of parasitic components is disposed on a plane between the top radiator and the bottom radiator.

8. The antenna of claim 6, wherein one of the plurality of parasitic components is disposed on a plane above the top radiator.

9. The antenna of claim 6, wherein one of the plurality of parasitic components is disposed on a plane below the bottom radiator.

10. The antenna of claim 1, further comprising a plurality of feeding components, physically separated from each other and insulated from the plurality of radiators, configured to tune a bandwidth of the antenna.

11. The antenna of claim 10, wherein at least two feeding components of the plurality of feeding components overlap each other.

12. The antenna of claim 11, wherein one of the plurality of feeding components is disposed along a radial line connecting a geometric center of the radiator and an outer edge of the radiator and on a plane different from a plane which the radiator is disposed.

13. The antenna of claim 10, wherein each feeding component is coupled to a respective signal trace through a via.

14. The antenna of claim 10, wherein each feeding component is disposed in a region between the geometric center and an outer edge of the radiator.

15. The antenna of claim 1, wherein the plurality of radiators are above a ground plane.

16. An antenna for multi-band communication, comprising:

a first radiator, a second radiator, disposed below the first radiator and partially overlapping the first radiator forming a first overlapping region;

a third radiator, disposed below the second radiator and partially overlapping the first radiator and the second radiator forming a second overlapping region;

a fourth radiator, disposed below the third radiator and partially overlapping the first radiator, the second radiator, and the third radiator forming a third overlapping region and a fourth overlapping region;

wherein the first radiator, the second radiator, the third radiator and the fourth radiator are physically separated;

a slit-slot is formed in each of the first overlapping region, the second overlapping region, the third overlapping region, and the fourth overlapping region; and the first radiator, the second radiator, the third radiator and the fourth radiator jointly function as one or more dipoles.

17. The antenna of claim 16, wherein a slit-slot is formed in each of the first overlapping region, the second overlapping region, the third overlapping region, and the fourth overlapping region, and wherein the slit-slot is extended from at least one of the overlapping regions to a non-overlapping region.

18. The antenna of claim 16, wherein a slit-slot is formed in at least one of the first overlapping region, the second overlapping region, the third overlapping region, and the fourth overlapping region, and on at least one radiator disposed below another radiator among the first radiator, the second radiator, the third radiator, and the fourth radiator.

19. The antenna of claim 16, wherein a slit-slot is formed in at least one of the first overlapping region, the second overlapping region, the third overlapping region, and the fourth overlapping region, and on the first radiator.

20. The antenna of claim 16, wherein a slit-slot is formed in at least one of the first overlapping region, the second overlapping region, the third overlapping region, and the fourth overlapping region, and on the first radiator and on at least one of the second radiator, the third radiator, and the fourth radiator.

* * * * *